Figure 3:
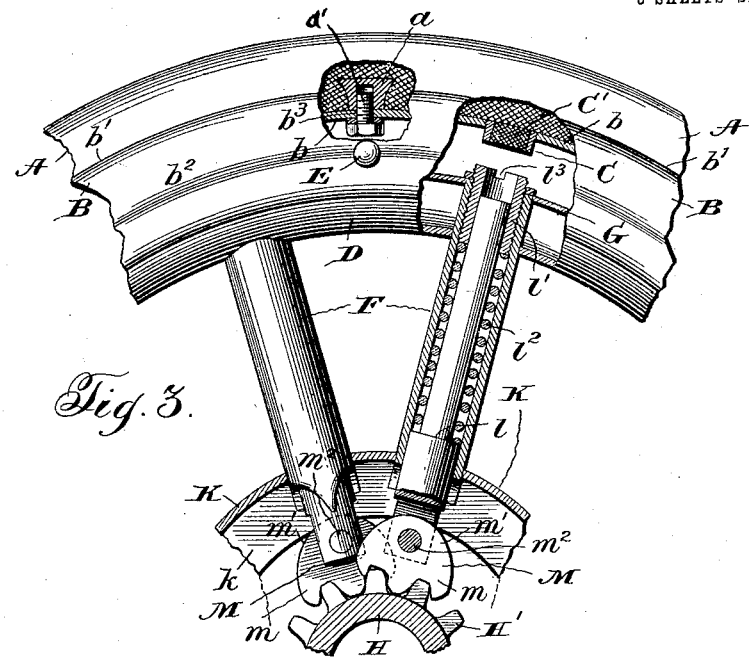

L. L. LANE.
MOTOR CAR WHEEL.
APPLICATION FILED FEB. 21, 1907.
1,113,449.
Patented Oct. 13, 1914.
3 SHEETS—SHEET 1.
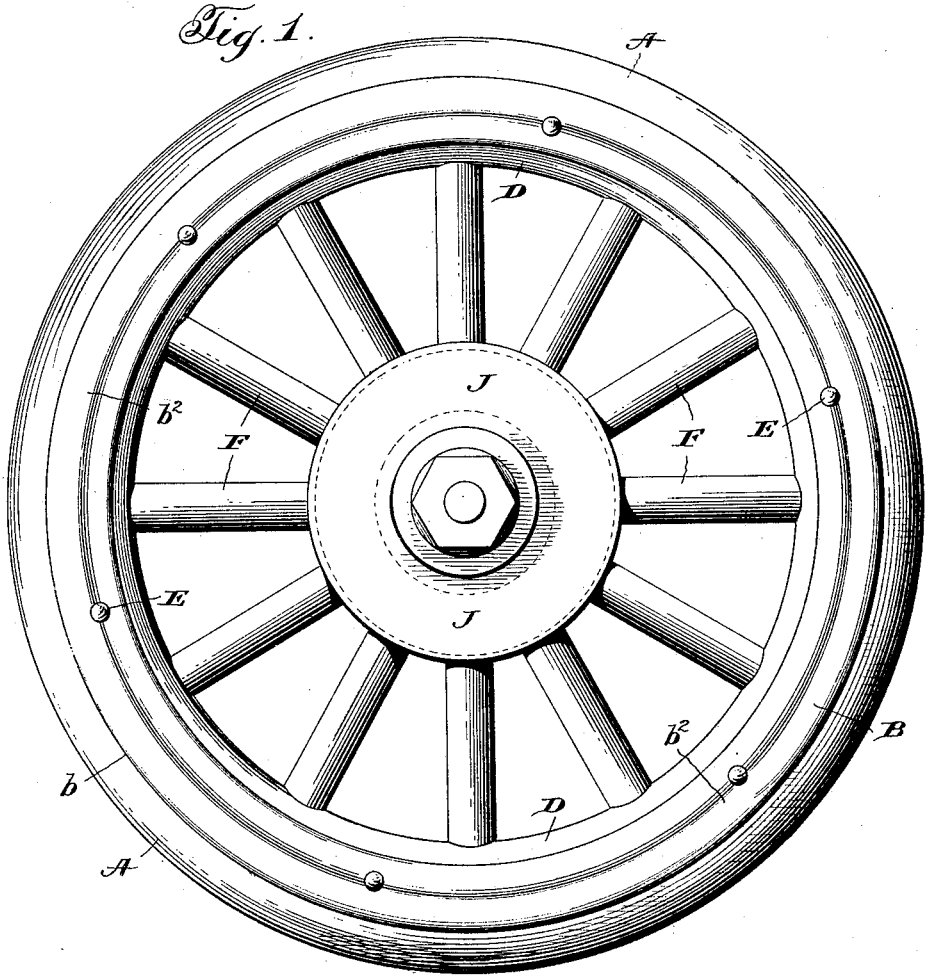
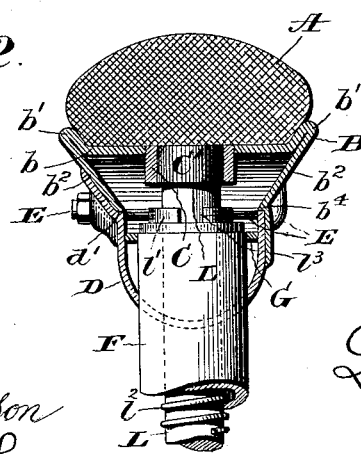

L. L. LANE.
MOTOR CAR WHEEL.
APPLICATION FILED FEB. 21, 1907.

1,113,449.

Patented Oct. 13, 1914.
3 SHEETS—SHEET 2.

Witnesses:
Jas. C. Hutchinson.
Thos. R. Heath.

Inventor:
Luther L. Lane

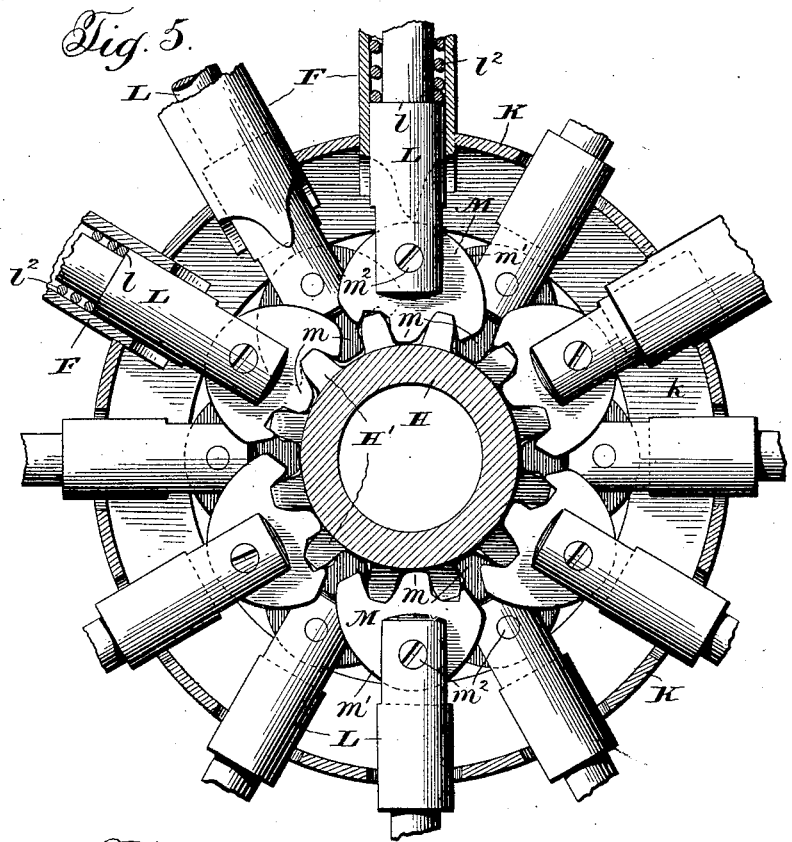
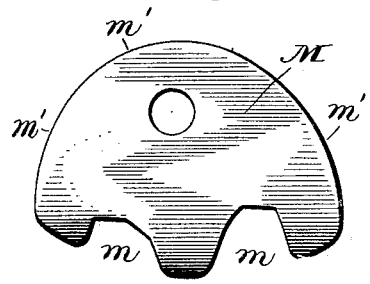
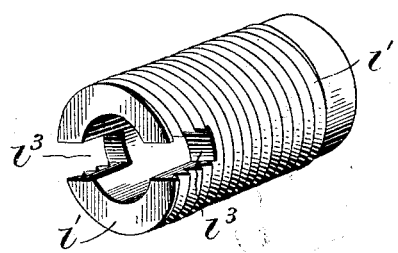

UNITED STATES PATENT OFFICE.

LUTHER LEO LANE, OF HILLSBORO, TEXAS, ASSIGNOR TO TEXAS AUTO SPECIALTY MANUFACTURING CO., A CORPORATION OF TEXAS.

MOTOR-CAR WHEEL.

1,113,449.     Specification of Letters Patent.     Patented Oct. 13, 1914.

Application filed February 21, 1907. Serial No. 358,601.

*To all whom it may concern:*

Be it known that I, LUTHER L. LANE, a citizen of the United States, residing at Hillsboro, in the county of Hill and State of Texas, have invented certain new and useful Improvements in Motor-Car Wheels, of which the following is a specification.

This invention relates to improvements in vehicle wheels and more particularly to wheels designed primarily for use on motor cars or other heavy vehicles.

One of the objects of the invention is the provision of a wheel of such a construction that sufficient resiliency is given to the parts to obviate as nearly as possible all vibration and jar and prevent damage to the parts incident to said vibration.

A further object of the invention is the provision of a wheel in which the rim member, through the agency of the spokes is yieldably connected to the hub in a manner to afford such resiliency that the pneumatic tire ordinarily used upon this type of wheel may be dispensed with.

A further object of the invention is the provision of the wheel of a construction which will minimize the jerk and dead strain on the driving chain when the motor or other driving device starts and the vehicle is given its initial movement, or the movement is accelerated.

These objects have been hitherto attempted to be attained by wheels having springs interposed between the rim and hub, which serves to normally hold the hub centrally with respect to the rim, but which, under a heavy load or upon the vehicle passing over an obstruction, will yield and permit of a relative movement of the rim and hub. The difficulty experienced with such constructions, however, has been that when the wheels are placed under a heavy load, or the wheels encounter obstructions, only those springs which are directly under the hubs are compressed, the other springs of the wheels, namely, all those not directly under the hubs, not only being not compressed, but on the contrary, expand by the relative movement of the rims and hubs, so that as soon as the load is removed, or the wheels have passed over the obstruction, the parts will assume their normal position with a sudden jerk, which is not only objectionable to the occupants of the vehicle, but which frequently result in injury to the parts of the car, and when such wheels are utilized on motor cars, to the driving mechanism of such cars. This difficulty has been, however, obviated by the present invention, the wheel being so constructed that when it is relieved of its load, or when it has passed over the obstruction, the hub and rim will be caused to gradually resume their normal relative position, thereby doing away with the objectionable vibration heretofore experienced with this class of devices.

My invention may be briefly summarized as consisting of certain novel details of construction and combinations and arrangements of parts described in the specification and set forth in the appended claims.

Figure 4:
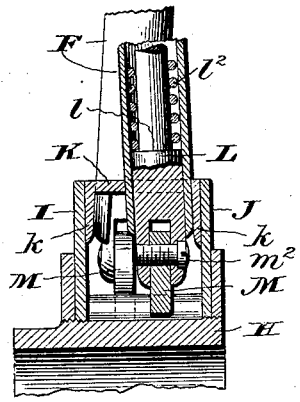

In the drawings: Figure 1 is a side elevation of my improved wheel. Fig. 2 is a detailed sectional view showing the position of one of the spoke plungers when the spring thereof is under compression. Fig. 3 is a fragmentary elevation, parts being shown in sections. Fig. 4 is a fragmentary cross-section of the hub showing the connection of the spokes therewith. Fig. 5 is a detail side elevation of hub with one of the side plates or disks removed. Fig. 6 is an enlarged detail view of one of the gears adapted to be secured to the inner end of a spoke plunger. Fig. 7 is a detail view of one of the sleeves utilized for regulating the tension of the spoke plunger springs.

Referring now to the drawings, A designates a solid elastic tire, which is seated within an annular rim or tire holder B, which comprises a base $b$ and side flanges $b'$, which extend outwardly from the edges of said base and between which is supported and held secure the tire. The base $b$ of the tire holder B is also provided at the edges thereof with inwardly extending flanges $b^2$ for a purpose to be hereinafter more particularly set forth. The tire holder B may be formed in any suitable manner, but I prefer to form the same of sheet metal and in this case form the inwardly bent flanges by folding the flanges $b'$ upon themselves as shown in the form of my invention illustrated in the drawings. The tire A may be secured to the rim or tire holding member in any desired manner. In this particular instance the base $b$ of the tire holding member B is provided with a plurality of apertures $b^3$, and embedded in the base of the tire A are a plurality of wedge shaped holding blocks $a$ having threaded openings engaged by holding or locking bolts $a'$, which project through the apertures $b^3$, the heads of said bolts engaging the inner side of the rim or tire holding member and holding the tire firmly thereto. Secured to the inner side of the base $b$ on the annular tire holding member B and depending therefrom are a plurality of sleeves C, in which are vulcanized, or otherwise secured rubber bumpers C′, which constitute buffers to limit the longitudinal movement of the yieldingly supported spoke plungers to be hereinafter described. One of the inwardly extending flanges $b^2$ of the tire holding member B extends inwardly for a greater distance than the other of said flanges, and the extension thus formed is off-set to form a seat $b^4$.

D designates the felly proper of the wheel, which is preferably U-shaped in cross-section. One of the side walls or flanges of the felly D extends outwardly beyond the edge of the other side wall and the extension $d$ thus formed is off-set from the remainder of the side wall of the felly to form a seat $d'$.

In assembling the parts of the wheel, the tire holding member B is placed on the felly with the lower edges of one of the inwardly bent flanges $b^2$ thereof engaging the seat $d'$ formed in one of the side walls of the felly D, and with the seat $b^4$ formed in the other flange $b^2$ thereof in engagement with the edge of the other side wall or flange of the felly B. When the parts occupy this position it will be seen that the annular flanges on the opposite sides of the tire holding member B lie along side of the adjacent portions of the felly. The annular flanges or extensions on the opposite sides of the tire holding member B and felly D are provided near the abutting portions of said tire holding member and felly with a plurality of alined apertures, through which pass bolts E, the heads of which are shaped to conform to the configuration of said annular flanges or extensions and upon the projecting ends of which are secured washers, also shaped to conform to the configuration of the annular flanges or extensions, and suitable lock-nuts, which serve to lock the annular tire holding member B and the tire carried thereby, to the felly. From this construction, it will be apparent that the tire member is so secured to the felly that it is impossible for the same to have any movement relative to the felly of its own, but, at the same time, it may be readily disengaged therefrom when it is desired to afford access to and to facilitate the assembling or removal of the parts of the wheel proper, with reference to the internal mechanism thereof. I have described the annular extensions as formed integral with one of the flanges $b^2$ of the tire member B and one of the side walls or flanges of the felly D. The felly D is provided with a plurality of apertures therein through which are designed to pass the upper ends of the staggered tubular spokes F, said spokes F being brazed or otherwise secured therein, and said openings being of such a size and pitch as to receive the spokes at the proper angles and to form tight joints therewith. The felly D is also provided on its interior with a reinforcing band G, which encircles the felly and the edges of which are brazed or otherwise secured to the inside walls of the said felly. The reinforcing band G is also provided with a plurality of openings of such size and pitch as to receive said spokes at the proper angle, and the upper ends of the spokes F are brazed or otherwise rigidly secured thereto.

The tire holding member B, felly D and reinforcing band G constitute an annular structure which I shall call the rim member.

H designates the hub of my improved wheel, which is provided with a toothed portion or gear $h'$ extending therearound. Threaded or otherwise secured on the hub H at each side of the toothed portion $h'$ thereof are the disks I and J, which are held against movement by suitable lock-nuts threaded upon the hub. Loosely mounted between the disks I and J is an annular housing member K, which is provided at the edges thereof with depending flanges $k$ which are designed to snugly engage the inner faces of the disks I and J. The annular housing member K is provided with a plurality of staggered apertures therein, in which are brazed or otherwise rigidly secured, the lower ends of the tubular spokes F. The disks I and J and the member K form a complete housing for the gear members, impervious to dust or other foreign matter.

Fitted within each of the tubular spokes is a spoke plunger L, which is provided near the inner end thereof with a shoulder $l$. Threaded within the outer end of each of the tubular spokes F is a tubular sleeve $l'$, through which the upper end of the spoke plunger is designed to work freely, and interposed between the inner end of each sleeve and the shoulder $l$ of the corresponding spoke plunger is a coil spring $l^2$. The upper end of the tubular sleeve $l'$ projects above the base of the reinforcing band and is provided with centrally disposed cross-slots $l^3$, so that the same may be readily engaged by a suitable wrench and the tension of the coil-spring $l^2$ adjusted. The sleeves $l'$ are held against movement in their adjusted positions by suitable lock nuts, or other locking means operable upon the projecting portions thereof. It will be apparent that the coil-springs serve normally to maintain the proper relation between the rim and the hub of the wheel, but they will permit the rim and hub to yieldingly approach each other, such movement of the rim, however, being limited by the buffers C' hereinbefore described, which are so positioned that they are designed to be engaged by the outer ends of the spoke plungers L. Each of the spoke plungers L is provided at its inner end with a bifurcation in which is pivotally mounted a segmental gear member M, of peculiar form. The members M are each provided with deformed gear teeth $m$ along one edge thereof, the other edge thereof being curved as at $m'$. The members M are secured between the bifurcated portions of the spoke plungers L by means of suitable screw pins $m^2$, which are eccentrically disposed with reference to the said members M. The selection of the pivotal points of the members M, relative to the pitch lines of the gears, as well as the form of the said members are such that on the occurrence of any relative movement between the geared portion of the hub and members M, said pivotal points will be moved in radial directions.

The toothed members M on the adjacent staggered spoke plungers are oppositely disposed, that is the toothed members on all the plungers at one side of the housing or those arranged at one angle are all similarly arranged with the longer ends extending in one direction, while the toothed members on the plungers at the other side of the housing and arranged at a different angle are oppositely disposed with the longer ends extending in the opposite direction. The longer ends of the members M exert greater compression on the springs, the rocking movements of all the members M being limited by the engagement of the outer curved portions $m'$ with the rear walls of the bifurcated portions of the plungers. The shorter ends of the members M are of such a length and pitch that they will not contact or engage the longer portions of the adjacent members M, when rocked on their pivots by any rotary or variable movement of the hub. This being the case it is obvious that if the members M were centrally pivoted in the bifurcated portions of spoke plungers, said member M would lock and incapacitate other acting mechanism in the wheel. This is however obviated by the eccentrically disposed pivoted members M, and their relative arrangement, as well as to the special pitch and odontographic points of the geared portions of said members and of the hub.

As was before stated, the members M have deformed teeth. The shape of the teeth is very carefully selected so as to provide a number of points of contact between each member M and the toothed portion of the hub, thus distributing the transmitted stresses over a number of parts, but mainly so that the plungers and members M will not lock but can yield radially even after the curved portions $m'$ of the members M engage the rear walls of the bifurcated portions of the plungers and just before the outer ends of the plungers engage the buffers, thus avoiding a shock and permitting a yielding or cushion effect when the members M are rocked to their limit. The teeth are of such a shape that when said members are rocked to their limit, the engaging surfaces of the teeth on the members M and hub are inclined permitting the members M to slide outwardly.

Having described the construction of my improved wheel, it will be obvious that when a load is placed thereon, or the wheel passes over an obstruction, the hub of the wheel will move in a vertical line and this vertical movement of the hub will cause the geared portion thereof to coöperate with the geared portions of members M to rock members M about their pivot points, causing the pivot points to move outward, the rocking movement of said members serving to compress the springs of the spoke plungers. From an examination of the drawings it will be apparent that during the vertical movement of the hub, not only will the springs of the spoke plungers directly underlying the hub be compressed, but the springs of all the spoke plungers at and below the horizontal axis of the wheel will be likewise compressed and even the springs of the spoke plungers adjacent to or above the horizontal axis of wheel will be subject to a slight amount of compression. From this it will be apparent that after the load has been removed from the wheel, or the wheel has passed over the obstruction, the parts thereof instead of returning to normal position with a jerk, will gradually resume their normal position, thereby doing away with the objectionable vibrations characteristic of devices of this kind. In fact in this respect my improved wheel is more of the nature of a shock absorber than a spring wheel.

It will be obvious from the hereinbefore described construction that when a wheel of this character is utilized as the driving wheel of a vehicle, should the driving chain be subjected to any sudden strain, such strain will be distributed equally among the springs of the wheel. When the longer portions are rocked to their limit by a rotary movement of the gear toothed hub when attached to the driving mechanism of a machine, since the positions of the members M of alternate plungers are reversed with respect to the members M on the other plungers, for either forward or backward movement of the vehicle the springs will be under the same compression. It will be apparent that as the rocking movements of the members M are limited by the engagement of their curved portions with the rear walls of the bifurcated portions of the spoke plungers L regardless of the direction in which the hub tends to turn, the geared portions can not be entirely disengaged.

I do not desire to limit myself to the precise form and construction shown in the drawings, as it is obvious that many minor changes may be made thereto without departing from the spirit of the invention, as defined in the appended claims.

I claim—

1. In a vehicle wheel, a rim member, a hub, suitable connections between the rim member and hub for holding them in substantially the same plane, a plurality of radially movable devices, means normally tending to force all of said devices toward the center, a shifting member for each radially movable device and adapted upon movement from normal position to shift the corresponding movable device outwardly, and an operating member carried by the hub and having portions engaging all of said shifting members and upon a relative movement of the rim member and hub causing a movement of a majority of the shifting members, thereby causing a movement of a majority of the radially movable devices.

2. In a vehicle wheel, a rim member, a hub, suitable connections between the rim member and hub for holding them in substantially the same plane, a plurality of radially movable devices, means normally tending to force all of said devices toward the center, a shifting member for each radially movable device and adapted upon movement from normal position to shift the corresponding movable device outwardly, and an operating member carried by the hub and having projections engaging all of said shifting members and upon a relative movement of the rim member and hub causing a movement of a majority of the shifting members, thereby causing a movement of a majority of the radially movable devices.

3. In a vehicle wheel, a rim, a plurality of hollow spokes secured therein, a plunger mounted in the inner end of each spoke, means within each spoke for shifting each plunger yieldingly toward the center, a hub provided with teeth, and a plunger shifting member pivoted in the end of the plunger and engaging the teeth of the hub whereby upon the relative movement of the hub with respect to the rim the majority of the plungers are shifted radially.

4. In a vehicle wheel, a hub having a toothed portion, a rim, and means intermediate the hub and rim including a plurality of longitudinally yieldable members provided at their inner ends with toothed portions engaging the toothed portion of the hub.

5. In a vehicle wheel, a hub having a toothed portion extending therearound, a rim, a plurality of longitudinally movable members intermediate the hub and rim and having pivotally secured to their inner ends toothed members engaging the toothed portion of the hub.

6. In a vehicle wheel, a hub having a toothed portion extending therearound, a rim, a plurality of longitudinally yieldable devices intermediate the hub and rim, and a plurality of members eccentrically pivoted to the inner ends of said devices and provided with toothed portions meshing with the toothed portion of the hub.

7. In a vehicle wheel, a hub having a toothed portion, a rim, a plurality of longitudinally yieldable devices intermediate the hub and rim, a plurality of members eccentrically pivoted to the inner ends of said devices and provided with toothed portions meshing with the toothed portion of the hub, the position of part of said members being reversed with respect to the others.

8. In a vehicle wheel, a hub having a toothed portion, a plurality of yieldable devices between the hub and rim, and members connected to the inner ends of said devices, said members having deformed teeth engaging the toothed portion of the hub.

9. In a vehicle wheel, a hub having a toothed portion, a rim, a plurality of yieldable devices between the hub and rim and a plurality of members eccentrically pivoted to the inner ends of said devices, said members having deformed teeth meshing with the toothed portion of the hub.

10. In a vehicle wheel, a hub having a toothed portion, a rim member, a plurality of tubular spokes rigidly secured at their outer ends to said rim member, a plurality of spring-pressed plungers mounted in said tubular spokes, and a plurality of members eccentrically pivoted to the inner ends of said plungers and provided with toothed portions meshing with the toothed portion of the hub.

11. In a vehicle wheel, a hub having a toothed portion, a rim member, a plurality of tubular spokes rigidly secured at their outer ends to said rim member, a plurality of yieldable plungers mounted in said tubular spokes and having their inner ends bifurcated, and a plurality of toothed members eccentrically pivoted in said bifurcated ends, and engaging the toothed portion of the hub.

12. In a vehicle wheel, a hub provided with a pair of separated disks and a toothed portion between said disks, an annular band loosely mounted between the disks on the hub, a rim member, tubular spokes rigidly connecting said rim member and band, and spring-pressed plungers mounted within said tubular spokes, and having the inner ends thereof engaging the toothed portion of said hub.

13. In a vehicle wheel, a hub having a toothed portion extending therearound and disks at each side of said toothed portion, and an annular band provided with depending flanges at the edges thereof loosely mounted between said disks, a rim member, tubular spokes rigidly connecting said rim member and band, and spring actuated plungers mounted within said tubular spokes, and having secured to their inner ends toothed portions meshing with the toothed portion of said hub.

In testimony whereof I affix my signature, in presence of two witnesses.

LUTHER LEO LANE.

Witnesses:
JOHN M. SPELLMAN,
THOS. R. HEATH.

Copies of this patent may be obtained for five cents each, by addressing the "Commissioner of Patents, Washington, D. C."